United States Patent
Beelman, III et al.

(10) Patent No.: US 10,683,176 B2
(45) Date of Patent: Jun. 16, 2020

(54) MATERIAL PLACER

(71) Applicant: Racehorse Investments, L.L.C., East St. Louis, IL (US)

(72) Inventors: Frank J. Beelman, III, Sunset Hills, MO (US); Loren Sackett, Alpine, UT (US); David Smith, Alpine, UT (US); Fred P. Smith, Alpine, UT (US); Nathan H. Morrill, Alpine, UT (US)

(73) Assignee: Racehorse Investments, L.L.C., East St. Louis, IL (US)

( * ) Notice: Subject to any disclaimer, the term of this patent is extended or adjusted under 35 U.S.C. 154(b) by 96 days.

(21) Appl. No.: 15/642,034

(22) Filed: Jul. 5, 2017

(65) Prior Publication Data

US 2019/0009994 A1     Jan. 10, 2019

(51) Int. Cl.
 *B65G 41/00* (2006.01)
 *B65G 47/51* (2006.01)

(52) U.S. Cl.
 CPC ....... *B65G 41/002* (2013.01); *B65G 47/5195* (2013.01)

(58) Field of Classification Search
 CPC .... B65G 47/44; B65G 47/5195; B65G 47/53; B65G 47/56; B65G 47/58; B65G 41/002; B65G 41/005; B65G 65/06; B65G 65/22; B65G 69/0408; B65G 67/24; B60P 1/36; B60P 1/38; B60P 1/42; E01C 19/182; E01C 19/15; E01C 19/2025; E01C 19/2045; E01C 19/48; E01C 19/185; E01C 2019/2075; E01C 2019/2085
See application file for complete search history.

(56) References Cited

U.S. PATENT DOCUMENTS

| | | | |
|---|---|---|---|
| 3,540,359 A | 11/1970 | Swisher, Jr. et al. | |
| 4,074,802 A | 2/1978 | Hudis | |
| 5,035,534 A * | 7/1991 | Brock | B60P 1/38 241/135 |
| 5,718,556 A * | 2/1998 | Forsyth | B60P 1/36 198/317 |
| 5,819,950 A * | 10/1998 | McCloskey | B07B 1/005 209/241 |
| 6,135,671 A | 10/2000 | Yasu et al. | |

(Continued)

OTHER PUBLICATIONS

Gomaco RTP-500 Rubber-Tracker Placer Photos and Specifications, http://www.gomaco.com/rtp500, (8) pages.

(Continued)

*Primary Examiner* — Glenn F Myers
(74) *Attorney, Agent, or Firm* — Stinson LLP

(57) ABSTRACT

A material placer includes conveyors on a frame for receiving material from a side dump trailer and conveying the material to a placing location. The conveyors can include a receiving conveyor for receiving material from the side dump trailer through an opening in a side of the placer, a funneling auger for funneling the material so it flows along a narrow flow path, a transfer conveyor for lifting the material after it is dumped from the side dump trailer, and/or a placing conveyor for placing the material at the placing location. The placing conveyor can be movable between a stowed position and a conveying position. A drive system for the conveyor may be located within a conveyor pulley to reduce the envelope of the material placer.

16 Claims, 10 Drawing Sheets

(56) References Cited

U.S. PATENT DOCUMENTS

| | | | | |
|---|---|---|---|---|
| 6,283,269 B1* | 9/2001 | Mayer | ............... | B65G 41/005 |
| | | | | 198/313 |
| 6,283,697 B1* | 9/2001 | Pierce | ............... | B60P 1/36 |
| | | | | 198/316.1 |
| 6,332,736 B1 | 12/2001 | Cape et al. | | |
| 6,820,733 B1 | 11/2004 | Werner, Jr. | | |
| 10,414,319 B2* | 9/2019 | Friesen | ............... | B65G 67/24 |
| 2016/0129823 A1* | 5/2016 | Millsaps, II | ............... | B60P 1/36 |
| | | | | 414/505 |
| 2017/0057762 A1* | 3/2017 | Renyer | ............... | A01D 90/00 |
| 2017/0297834 A1* | 10/2017 | Friesen | ............... | B65G 67/24 |
| 2017/0334654 A1* | 11/2017 | Friesen | ............... | B60P 1/36 |

OTHER PUBLICATIONS

Gomaco: RTP-500 Rubber-Tracked Placer Applications, http://www.gomaco.com/Resources/rtp500apps.html, (2) pages.

\* cited by examiner

MATERIAL PLACER

FIELD

The present disclosure generally relates to a material placer and more specifically to a material placer for receiving material from a side dump trailer and placing the material at a receiving area of a piece of heavy machinery.

BACKGROUND

Material placers are configured to receive material such as asphalt and concrete and move the material to the receiving area of piece of movable heavy machinery such as a road paving machine. Material placers are mobile to continuously place material in the receiving area as the machinery moves along the ground. Typically, material placers are designed to receive material from dump trucks or rear dump trailers driven by forward facing tractors. Each tractor drives the trailer backward to operatively position the trailer for dumping the material onto the receiving area of the machinery. After the material is dumped, each tractor must drive forward away from the machinery before another tractor can back its trailer into position.

SUMMARY

In one aspect, a material placer for placing material at a placing location comprises a support frame. A receiving conveyor is supported on the support frame and extends from an upstream end portion to a downstream end portion. The receiving conveyor is configured to convey the received material along a flow path to a location adjacent the downstream end portion thereof. A material receiving opening is located on a side of the material placer and faces in a direction transverse to the material flow path on the receiving conveyor. The material receiving opening is sized and shaped to receive material dumped from a side dump trailer. A transfer conveyor is supported on the support frame and extends from an upstream end portion to a downstream end portion. The transfer conveyor is configured to receive at the upstream end portion the material conveyed by the receiving conveyor. The transfer conveyor is configured to convey the material to a location adjacent the downstream end portion and is oriented at an incline with respect to the support frame to lift the material with respect to the support frame as the transfer conveyor conveys the material. A placing conveyor is supported on the carriage and has an upstream end portion and a downstream end portion. The placing conveyor is configured to receive at the upstream end portion the material conveyed from the transfer conveyor and convey the material in a placing direction extending away from the support frame to the placing location.

In another aspect, a material placer for placing material at a placing location comprises a support frame having a length and a front end portion and a rear end portion spaced apart along the length. A receiving conveyor supported on the support frame is sized and arranged for receiving the material when the material is dumped from a side dump trailer and configured to convey the received material in a rearward direction along the length of the support frame. A placing conveyor has an upstream end portion and a downstream end portion. The placing conveyor is movable with respect to the support frame from a stowed position in which the placing conveyor extends over the support frame to a conveying position in which the upstream end portion of the placing conveyor is positioned for receiving the material conveyed from the receiving conveyor and the downstream end portion of the placing conveyor is spaced apart from the support frame for conveying the material to the placing location.

A drive system comprises a shaft configured for engagement with a driven structure, and a motor unit mounted within the shaft and engaging the shaft to drive the rotation of the shaft. The motor unit is disposed at least partially within the shaft. The motor unit includes an output shaft disposed within the shaft and connected to the shaft to transmit rotation from the output shaft to the shaft.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
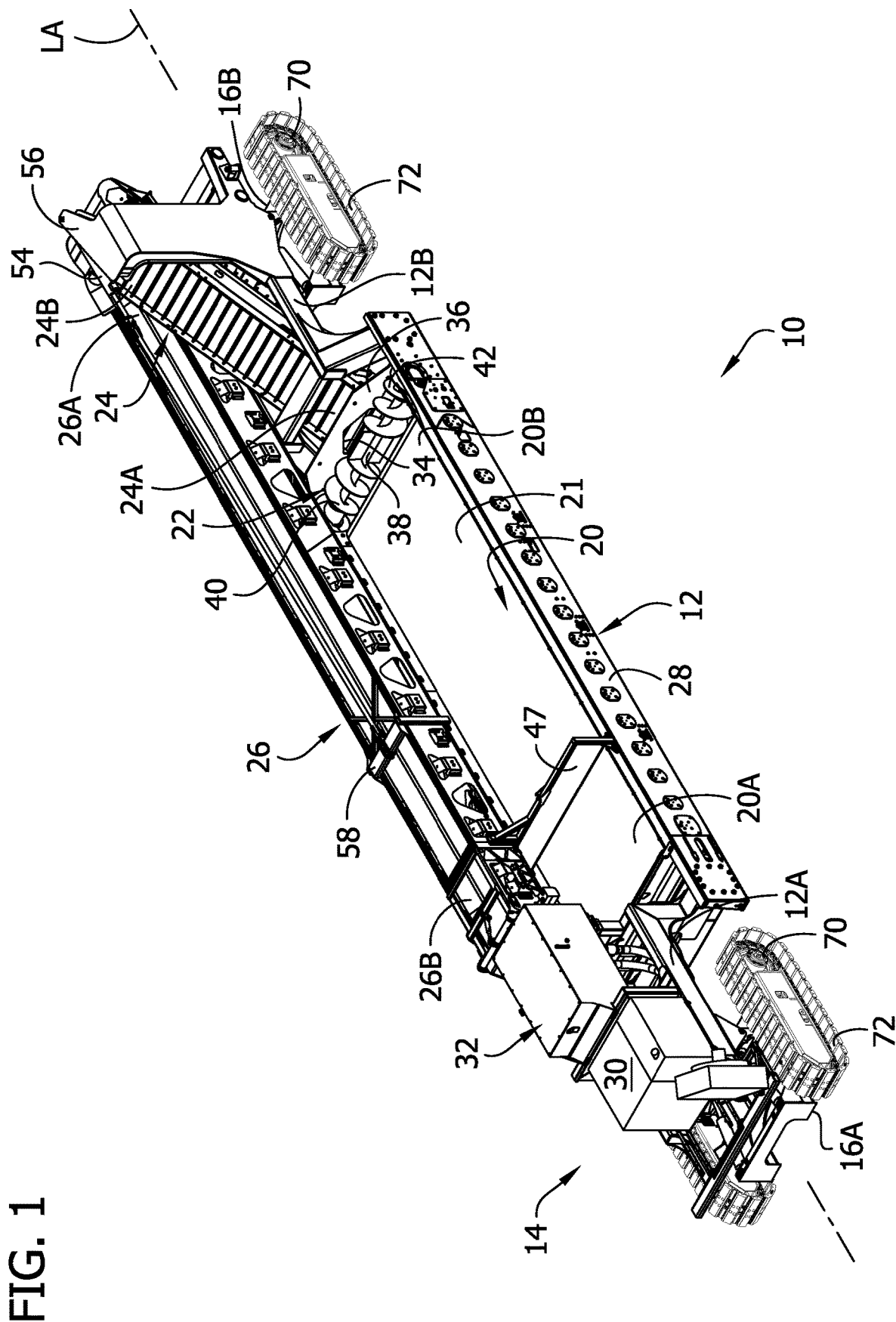
FIG. 1 is a perspective of a material placer in a stowed configuration.

Referring to FIGS. 1-6, a material placer for placing material such as asphalt, concrete, etc., in the receiving area (broadly, a placing location) of heavy machinery such as a road paving machine (not shown), is generally indicated at reference number 10. The material placer includes a support frame 12 having a front end portion 12A and a rear end portion 12B spaced apart along an axis LA (FIG. 2) and defining a length LS of the support frame. A power system, generally indicated at 14, including front and rear carriages 16A, 16B mounted on the front and rear end portions 12A, 12B of the support frame 12, respectively, is configured for driving the material placer 10 over the ground or another support surface. In general, the material placer 10 includes conveyors 20, 22, 24, 26 (e.g., one or more conveyors) mounted on the support frame for receiving the material from a side dump trailer (e.g., a trailer that dumps material by pivoting a dump bucket about a longitudinal axis of the trailer or an axis generally perpendicular to the axes of rotation of the wheels of the trailer; not shown). A material receiving opening 27 (FIG. 4) located on a side of the material placer 10 and facing in a direction transverse to the longitudinal axis LA is sized and shaped to receive material dumped from a side dump trailer (in the illustrated embodiment the sides of the material placer 10 are fully open above the support frame 12 to define respective material receiving openings). After receiving the material from the side dump trailer through the material receiving opening 27, the conveyors 20, 22, 24, 26 are configured to convey the received material to a placing location, typically at the receiving area of a piece of heavy machinery. For example, in an exemplary embodiment, the conveyors 20, 22, 24, 26 convey the material to a receiving area of a road paving machine for use in paving a road.

As will be explained in further detail below, the material placer 10 is sized for being loaded onto an over-the-road trailer and transported over the U.S. interstate highway system or another road to a jobsite. At the jobsite, the placer 10 is highly maneuverable and can navigate over uneven or sloped terrain to access the desired placing location (e.g., a location adjacent the receiving area of the heavy machinery). Furthermore, the conveyors 20, 22, 24, 26 allow the placer 10 to precisely place the material received from the side dump trailer at the specified placing location and to continuously adjust the placing location to, for example, distribute the material across a width of a roadway. As will be apparent, when the placer 10 is used instead of a conventional placer compatible with rear dump trailers, material can be placed in the receiving area of a road paving machine substantially faster for greater throughput.

In the illustrated embodiment, the frame 12 is a steel box frame configured to support heavy loads. The frame 12 includes left and right main side members 28 that define a width WF (FIG. 2) of the frame. As explained below, in a stowed configuration shown in FIGS. 1-3, all of the conveyors 20, 22, 24, 26 are supported on the frame 12 between the main side members 28, within width WF of the frame 12. In one or more embodiments, the width WF of the frame 12 is less than or equal to about 102 inches (about 2.59 meters). Thus, the frame 12 and the conveyors 20, 22, 24, 26 are sized in the stowed configuration for traveling by highway trailer on the U.S. interstate highway system. The front end portion 12B of the frame 12 supports a diesel engine 30 that powers a hydraulic power system 32. The frame 12 supports several of the conveyors 20, 22, 24, 26 as described in further detail below. As also described below, the drive carriages 16A, 16B are mounted underneath the respective end portions 12A, 12B of the frame 12 and support the frame on a support surface such that the main side members 28 are spaced apart from the support surface by a height of at least five inches (13 cm). This provides the material placer 10 with sufficient ground clearance to be loaded and unloaded from a sliding axle trailer.

A receiving conveyor 20 is supported on the frame 12 between the side members 28. In the illustrated embodiment, the receiving conveyor 20 comprises a smooth conveyor belt 21 (broadly, "a driven structure"). The conveyor belt 21 extends around an array of pulleys (described hereinafter, but concealed by the belt in FIGS. 1-6) for conveying heavy loads of asphalt and concrete. In other embodiments, other types of conveyors can be used for the receiving conveyor (e.g., augers, elevator belts, etc.). The receiving conveyor 20 has a length LR (FIG. 2) extending from an upstream end portion 20A to a downstream end portion 20B. The receiving conveyor 20 is configured to convey material in a rearward direction RD (FIG. 2) to a location adjacent (e.g., immediately downstream of) the downstream end portion 20B. In the illustrated embodiment, the length LR is oriented substantially parallel to the axis LA of the frame 12. The receiving conveyor 20 also has a width WR (FIG. 2) extending between opposite longitudinal side edges of the conveyor. The length LR and width WR extend in a plane substantially parallel to the underlying support surface of the material placer 10 (e.g., the ground).

The receiving conveyor 20 is sized and arranged for receiving material as it is dumped from a side dump trailer. The sides of the material placer 10 are substantially open above the receiving conveyor 20 to define first and second material receiving openings 27 above the conveyor. The receiving conveyor 20 is sized and arranged to provide a large receiving surface for material dumped through the material receiving openings 27 onto the receiving conveyor from a side dump trailer. Suitably, the length LR of the receiving conveyor 20 is closer in length to the length of the side dump trailer from which it receives material. For example, in one or more embodiments, the length LR is at least about 15 feet (4.6 m). As illustrated, the length LR is about 20 feet (6.1 m). Suitably, the receiving conveyor 20 is sufficiently wide so that substantially all the material dumped from the side dump trailer lands on the receiving conveyor between the main side members 28 of the support frame 12. In one embodiment, the width WR of the receiving conveyor 20 is at least about 80 inches (203.2 cm). In the illustrated embodiment, the width WR of the receiving conveyor 20 spans substantially the entire distance between the two main side members 28 of the frame 12.

Figure 9:
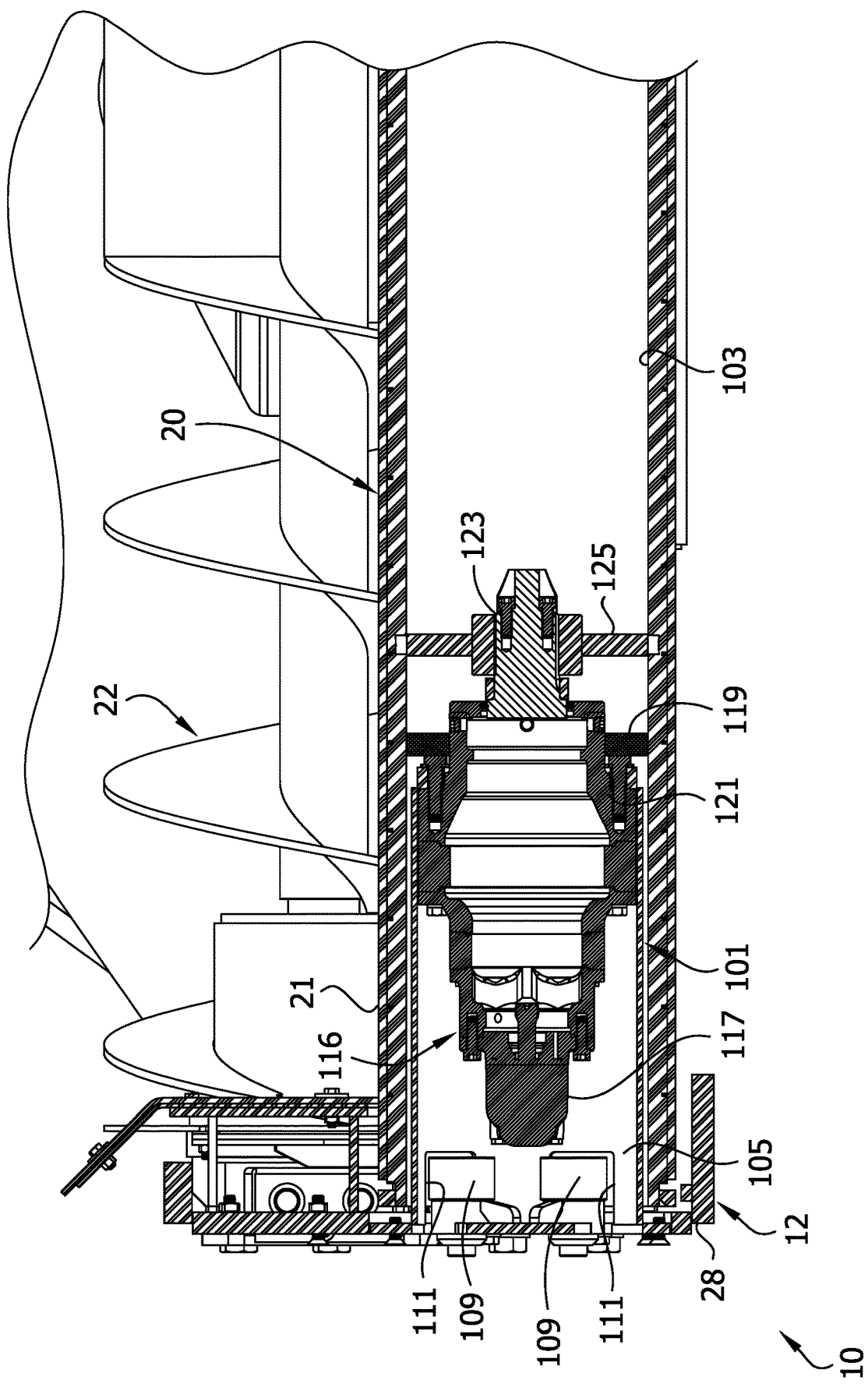
FIG. 9 is an enlarged fragmentary cross-section of the material placer taken in the plane of line 9-9 of FIG. 2.

Referring to FIG. 9, to maximize the width WR of the receiving conveyor 20 between the main side members 28 (broadly, "stationary exterior structure"), at least one drive motor assembly 101 of the hydraulic power system 32 is mounted inside a drive pulley 103 (broadly, "a shaft") of for driving the conveyor. In the illustrated embodiment, the drive pulley 103 is tubular so that the entire interior is hollow. However, only a portion of the drive pulley 103 need be hollow to receive motor assembly 101. In FIG. 9, only a left side portion of the drive pulley 103 is shown, but it is understood that another drive motor assembly 101 could be mounted in the right side portion of the drive pulley. The illustrated drive motor assembly 101 includes a mounting enclosure 105 (broadly, "motor unit mount") fixed to the main side member 28 of the frame 12. The enclosure 105 extends from the main side member 28 into the drive pulley 103 and is spaced apart from the drive pulley so that the drive pulley is substantially free to rotate around the enclosure. The illustrated enclosure 105 is generally tube-shaped. Bearings 109 are connected to the enclosure 105 and extend through openings 111 in a side wall of the enclosure to bear against an internal surface of the pulley 103. In one or more embodiments, the bearings 109 are adjustable to position the pulley 103 for operative engagement with the belt 21 of the conveyor 20 (e.g., to tension the belt on the pulley). A motor unit 116 comprises a hydraulic motor 117, a reducing gear box 121 and an output shaft 123. The motor unit 116 is partially received in the enclosure 105. A bearing disc 119 extends from the gear box 121 of the motor 117 and bears against the interior surface of the drive pulley 103 (which rotates relative to the bearing disc) at a location spaced apart inwardly from the main side member 28 to maintain alignment between the motor assembly 101 and the drive pulley 103. The motor 117 is configured to drive rotation of the output shaft 123 through the gear box 121. A drive disc 125 extends from the output shaft 123 and is fixed to the drive pulley 103 to transmit rotation from the output shaft to the drive pulley for conjoint rotation. The motor unit 116 is mounted within the drive pulley 103 so that it is everywhere in radially opposed relation with respect to the conveyor belt 21. Mounting the receiving conveyor 20 between the main side members 28 provides structural support for the large loads imparted on the conveyor when the material is dumped from the side dump trailer; mounting the drive motor inside the drive pulley maximizes the width of the conveyor by removing drive components that typically would connect to the end of a drive pulley, outboard of the conveyor.

The conveyor immediately downstream of the receiving conveyor 20 in the illustrated material placer 10 is a funneling auger 22 (broadly, "a driven structure"). The funneling auger 22 is configured to receive the material conveyed by the receiving conveyor 20 and convey the material through a guide opening 34 (FIG. 1) formed in a funneling plate 36. The auger 22 comprises a shaft 38 mounted on the support frame 12 for rotation about a funneling auger axis FA (FIG. 2). The shaft 38 spans the entire gap between the main side members 28 in order to receive and convey substantially all of the material conveyed by the receiving conveyor 20.

Figure 10:
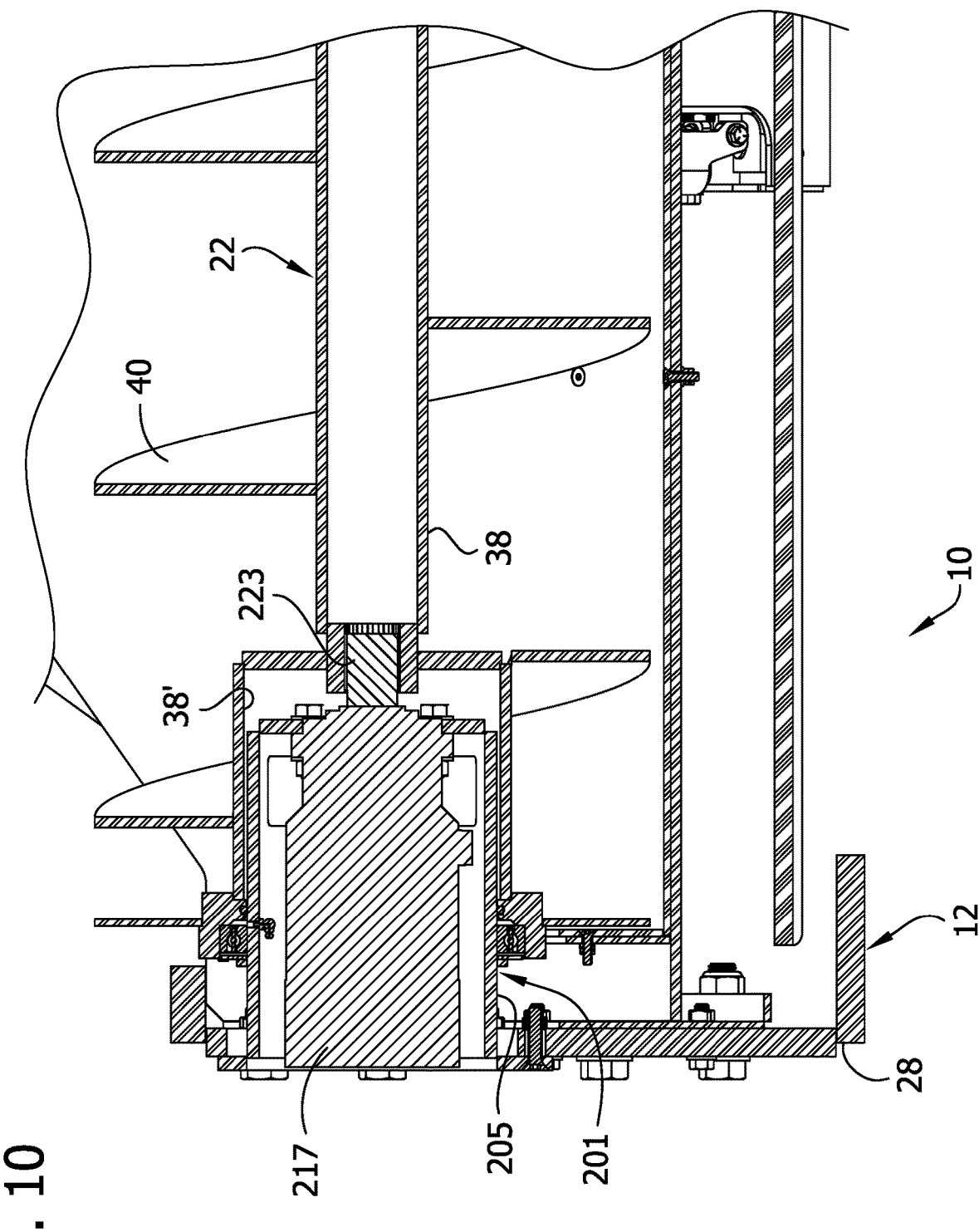
FIG. 10 is an enlarged fragmentary cross-section of the material placer taken in the plane of line 10-10 of FIG. 2.

Referring to FIG. 10, like the receiving conveyor 20, the illustrated funneling auger 22 includes at least one drive motor assembly 201 received in the shaft 38 for driving rotation of the funneling auger. The drive motor assembly 201 includes an enclosure 205 received in a large-diameter end portion 38' of the shaft 38 and fixed in place with respect to the main side member 28 of the frame 12. The enclosure 205 is arranged relative to the shaft 38 so that the shaft is substantially free to rotate relative to the enclosure. A motor unit 217 of the hydraulic power system 32 is secured to the enclosure 205 and includes a rotatable output shaft 223 extending through the enclosure. The output shaft 223 is linked to the auger shaft 38 to drive rotation of the funneling auger 22. As above, the arrangement of the drive motor assembly 201 inside the large diameter portion 38' of the shaft 38 of the funneling auger 22 maximizes the functional width of the funneling auger between the side members 28.

Figure 2:
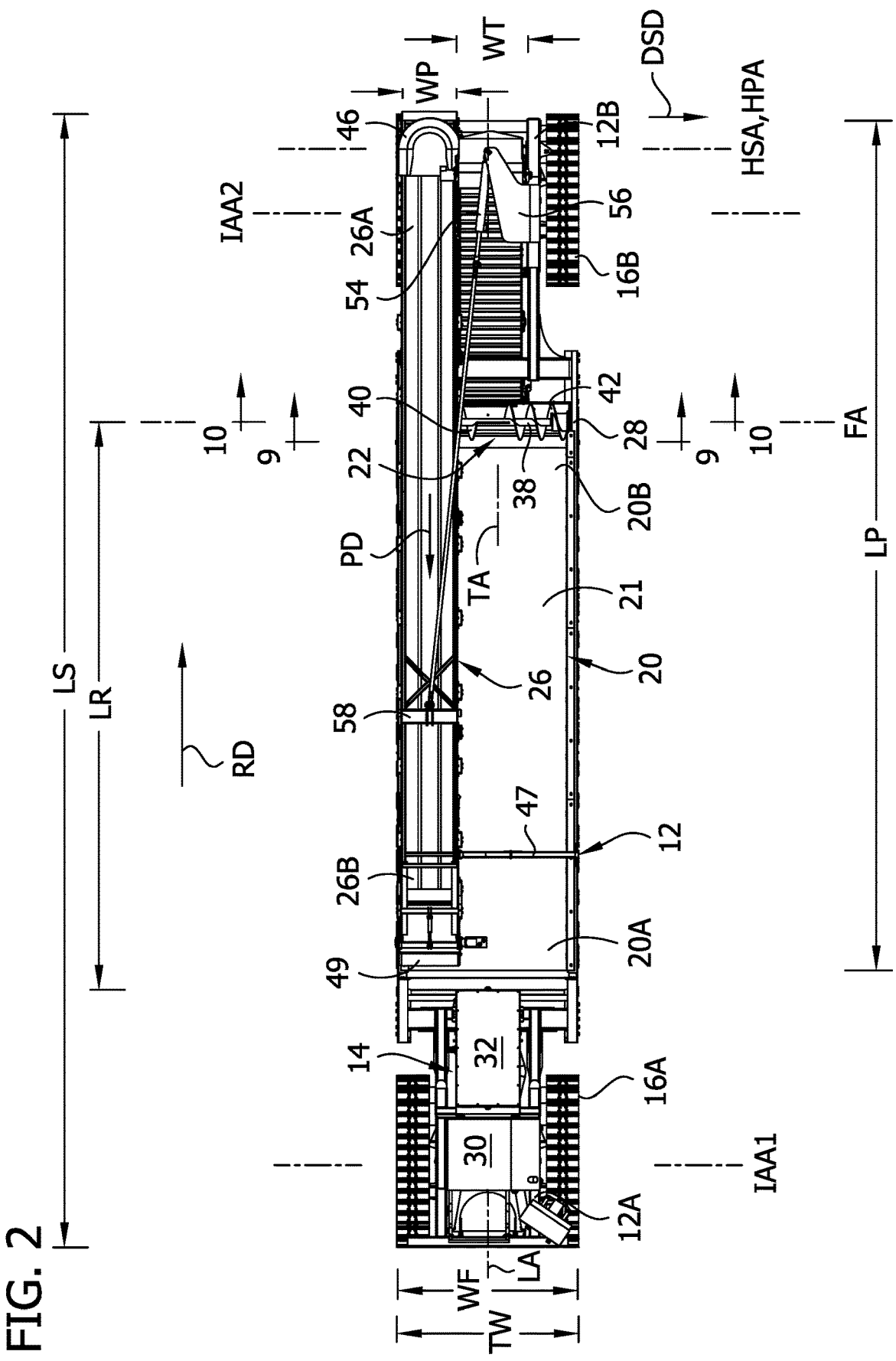
FIG. 2 is a top plan view of the material placer in the stowed configuration.

Referring to FIGS. 1 and 2, a first screw thread 40 extends along a first end segment of the auger shaft 38 and has a pitch for conveying material laterally inward and in the rearward direction RD as the shaft rotates about the axis FA. A second screw thread 42 extending along an opposite second end segment of the shaft 38 and has an oppositely oriented pitch for conveying material rearward and in an opposite laterally inwardly extending direction. The funneling auger 22 is thus configured for receiving material from the full width WR of the receiving conveyor 20 and conveying substantially all of the material rearward through the guide opening 34 in the funneling plate 36.

A transfer conveyor 24 is configured to receive the material from the funneling auger 22 and lift the material to convey the material to an elevated position. In the illustrated embodiment the transfer conveyor 24 comprises an elevator conveyor belt, but other embodiments can use other types of conveyors (e.g., augers, etc.) without departing from the scope of the invention. As above, the transfer conveyor is driven by a hydraulic motor (not shown) of the hydraulic power system 32. The transfer conveyor 24 extends from an upstream end portion 24A to a downstream end portion 24B and has a length LT (FIG. 3) extending along an axis TA between the upstream and downstream end portions. The upstream end portion 24A is positioned to receive the material that the funneling auger 22 conveys through the guide opening 34 in the funneling plate 36. The transfer conveyor 24 has a width WT (FIG. 2) oriented transverse to its length LT that is substantially smaller than the width WR of the receiving conveyor 20. As will be explained in further detail below, the narrow width WT of the transfer conveyor 24 allows the material placer 10 to transition between the stowed configuration shown in FIGS. 1-3 and a deployed configuration shown in FIGS. 4 and 5.

Figure 3:
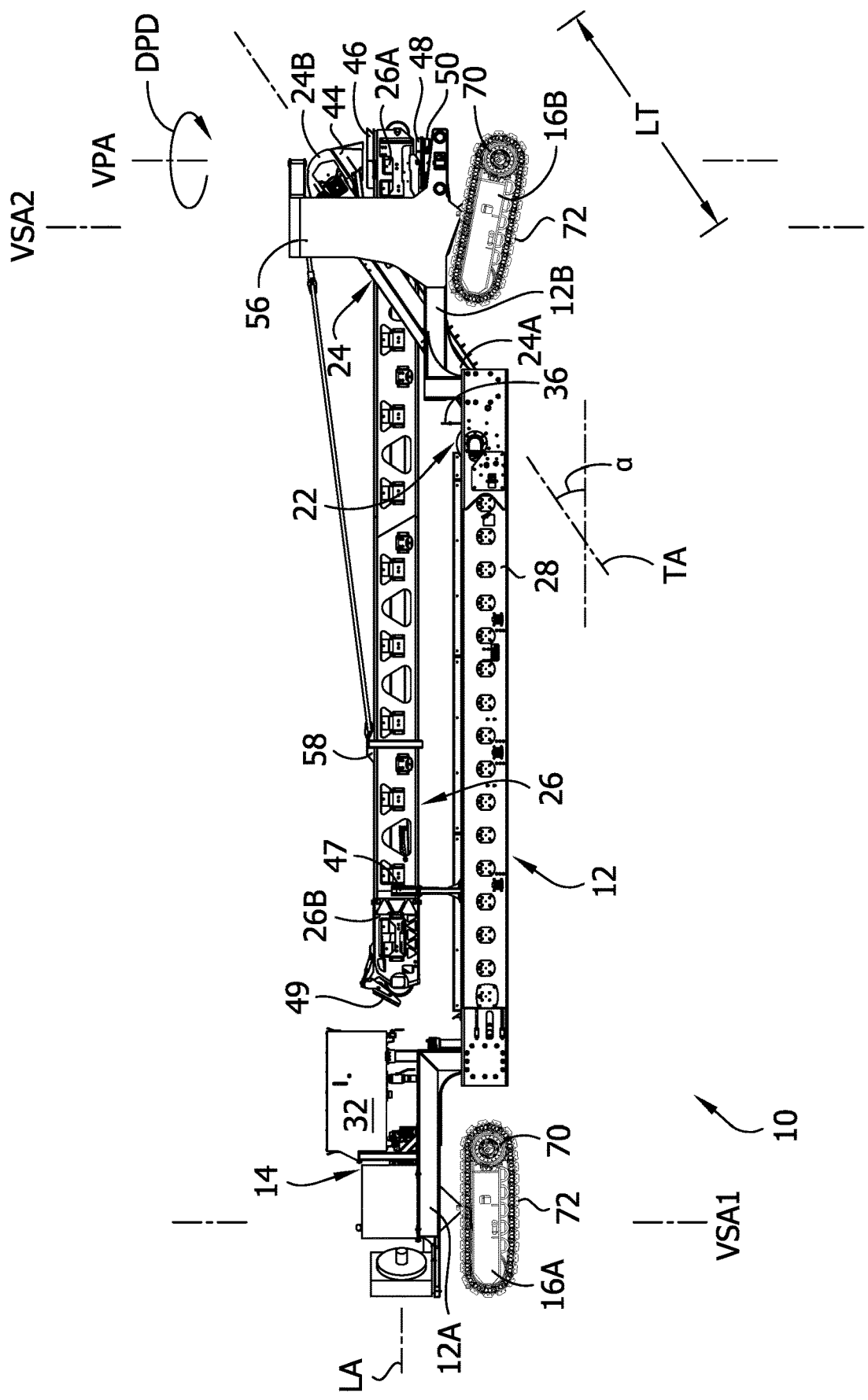
FIG. 3 is a side elevation of the material placer in the stowed configuration illustrating a rear carriage pivoted to an inclined position.

The transfer conveyor 24 is oriented at an incline with respect to the support frame 12 and the receiving conveyor 20. Referring to FIG. 3, the axis TA of the transfer conveyor 24 is oriented at an angle of incline $\alpha$ with respect to the axis LA of the support frame. Suitably, the angle of incline $\alpha$ is in an inclusive range of from about 20° to about 45°. The inclined angle of the transfer conveyor 24 causes the transfer conveyor to lift the material with respect to the support frame 12 and the receiving conveyor 20 as the transfer conveyor conveys the material to a location adjacent and downstream of the downstream end portion 24B. In the illustrated embodiment, a chute 44 is mounted on the downstream end portion 24B of the transfer conveyor 24 for guiding material downward from the conveyor.

Figure 4:
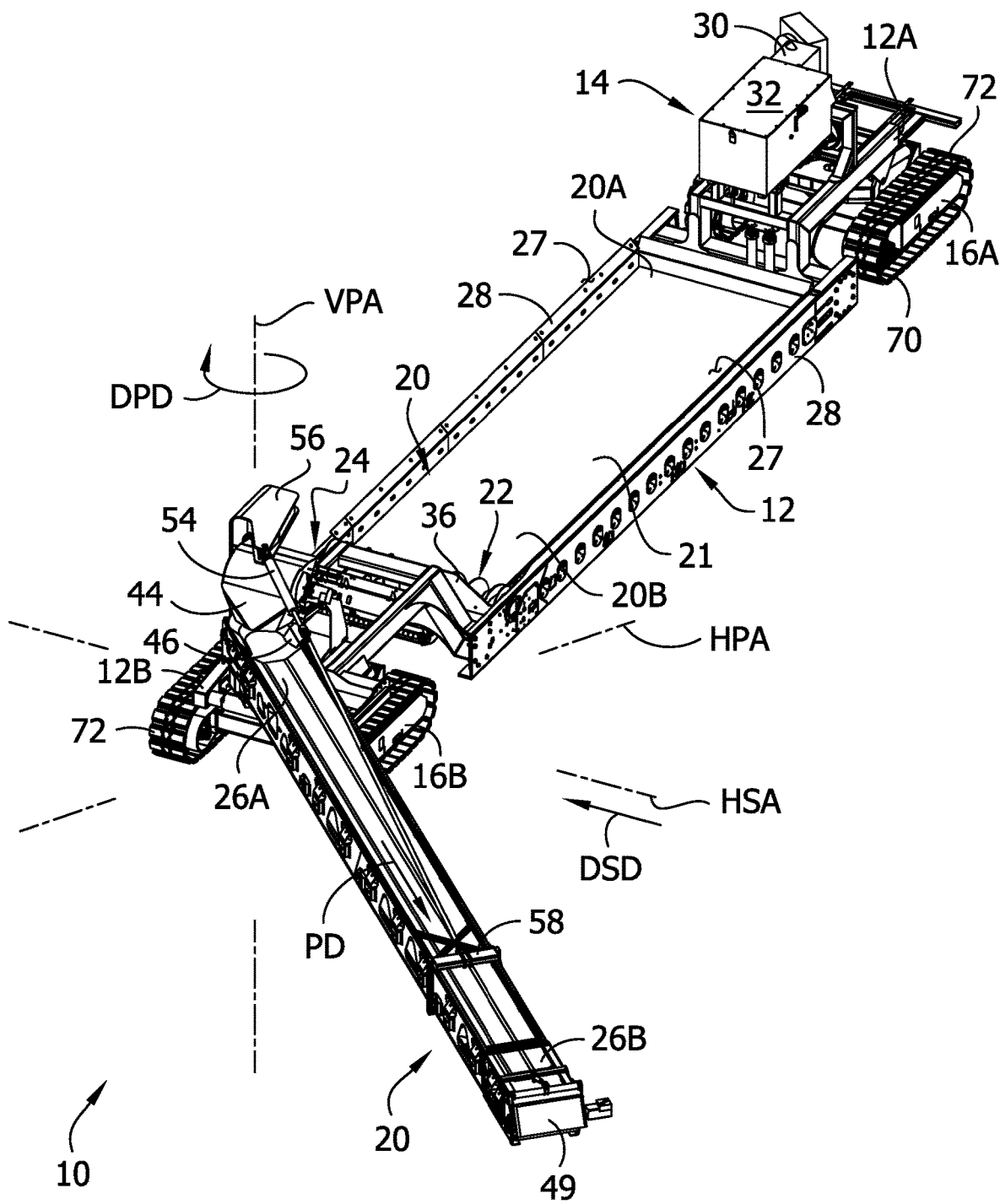
FIG. 4 is a perspective of the material placer in a deployed configuration.
Figure 5:
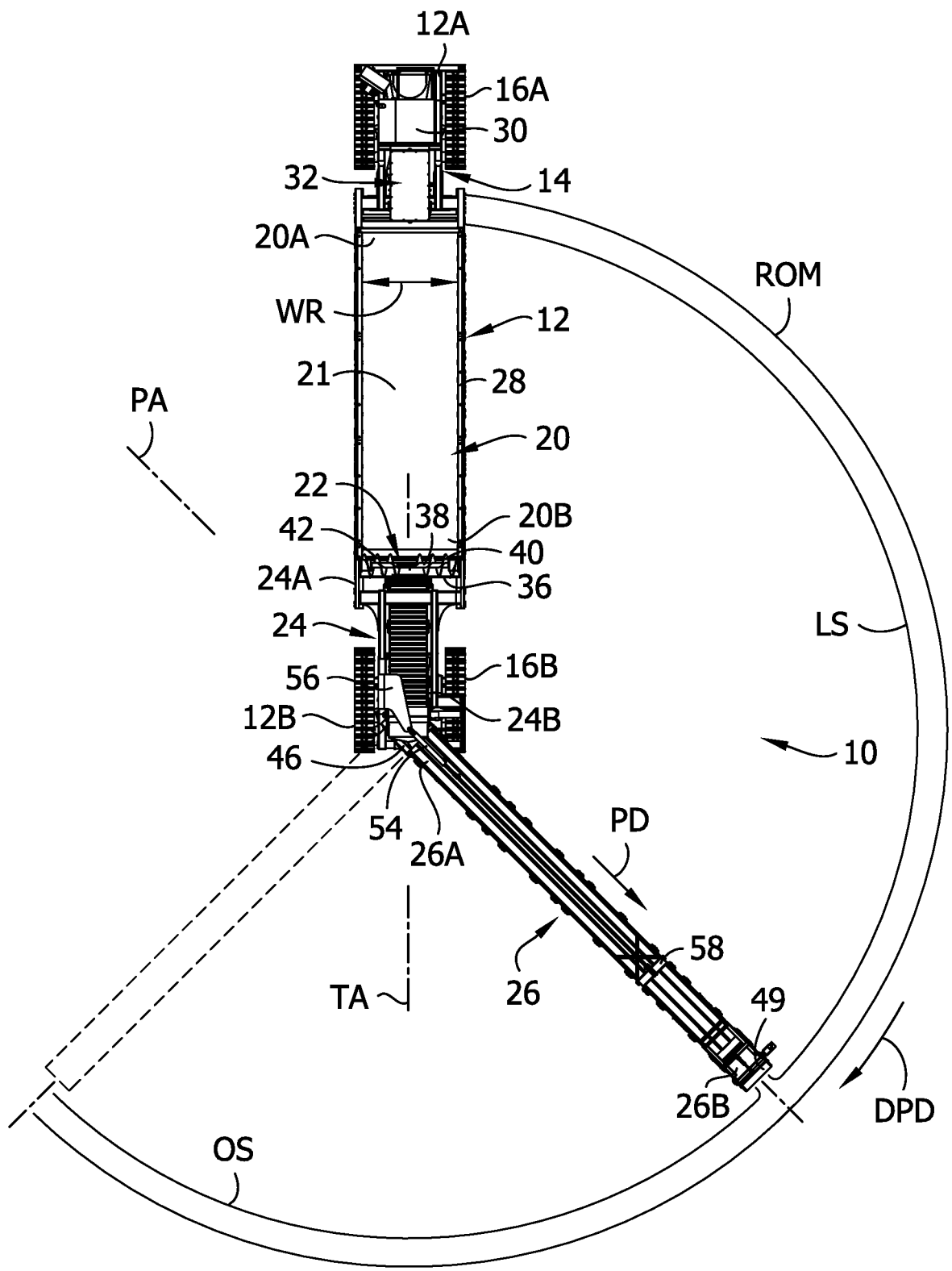
FIG. 5 is a top plan view of the material placer in the deployed configuration and illustrating a terminal deployed position of a placing conveyor of the material placer in phantom.

Referring to FIGS. 4 and 5, a placing conveyor 26 is configured to deliver the material conveyed from the transfer conveyor 24 to a placing location, thereby placing the material at the placing location. In the illustrated embodiment, the placing conveyor 26 comprises a smooth conveyor belt extending around an array of pulleys (concealed by the belt). In other embodiments, other types of conveyors can be used for the placing conveyor (e.g., augers, elevator belts, etc.). The placing conveyor 26 has a length LP (FIG. 2) extending from an upstream end portion 26A to a downstream end portion 26B. In one or more embodiments, the length LP of the placing conveyor is at least about 12 feet (3.7 m). In the illustrated embodiment the length LP of the placing conveyor 26 is about 38 feet (11.6 m), which is less than the length LS of the support frame 12 so that the placing conveyor does not protrude beyond the support frame 12 in the stowed configuration (FIGS. 1-3). The placing conveyor 26 also has a width WP (FIG. 2). The width WP of the placing conveyor 26 is less than the width WF of the support frame 12 so that the placing conveyor can be positioned beside the transfer conveyor 24 above the support frame without extending laterally beyond the width WF of the support frame in the stowed configuration. For example, the combined widths WP, WT of the placing conveyor and the transfer conveyor are preferably less than or equal to 102 inches (2.59 m).

As explained below, the placing conveyor 26 is selectively deployable as shown in FIGS. 4 and 5. When the placing conveyor 26 is deployed, it can receive the material conveyed from the transfer conveyor 24 and convey the material in a placing direction PD. In the illustrated embodiment, a funnel 46 is mounted on the upstream end portion 26A of the placing conveyor 26. In the deployed configuration, the funnel 46 is positioned below the chute 44 of the transfer conveyor 24 for guiding the material delivered through the chute 44 onto the upstream end portion 24A of the placing conveyor 24. The placing direction PD extends along the length LP of the conveyor toward the downstream end portion 26B. A placing chute 49 is mounted on the downstream end portion 26B of the placing conveyor 26 to discharge the material from the placing conveyor in a generally downward direction to the desired placing location. As explained in further detail below, the placing conveyor 26 is movable with respect to the support frame 12 to adjust the placing direction PD and thereby adjust the placing location without using the power system 14 to drive movement of the material placer 10 along the support surface. In the deployed configuration of the illustrated material placer 10, the placing conveyor 26 always extends away from the rear end portion 12B of the support frame such that the placing location is spaced apart from the support frame by the length LP.

In the stowed configuration shown in FIGS. 1-3, the placing conveyor 26 extends over the support frame 12 such that all of the components of the material placer 10 fit inside an envelope that is sized for normal travel on the U.S. interstate highway system via a sliding axle trailer. In the stowed configuration, the upstream end portion 26A of the placing conveyor 26 is positioned over the rear end portion 12B of the support frame, at a location laterally spaced apart from the axis TA of the transfer conveyor 24. The downstream end portion 26B of the placing conveyor 26 is positioned over the front end portion 12A of the support frame 12. Suitably, the downstream end portion 26B of the placing conveyor 26 is supported in the stowed configuration on a support bracket 47 of the support frame 12. In the deployed configuration shown in FIGS. 4 and 5, the upstream end portion 26A of the placing conveyor 26 is generally aligned with the axis TA of the transfer conveyor 24 and positioned below the discharge chute 44 (i.e., the funnel 46 is positioned to receive material discharged through the chute 44 and guide the material onto the upstream end portion of the conveyor belt). The downstream end portion 26B extends forward from the rear end portion 12B of the support frame 12 to a location spaced apart from the support frame. In the illustrated embodiment, the support bracket 47 is removed in the deployed configuration.

Figure 6:
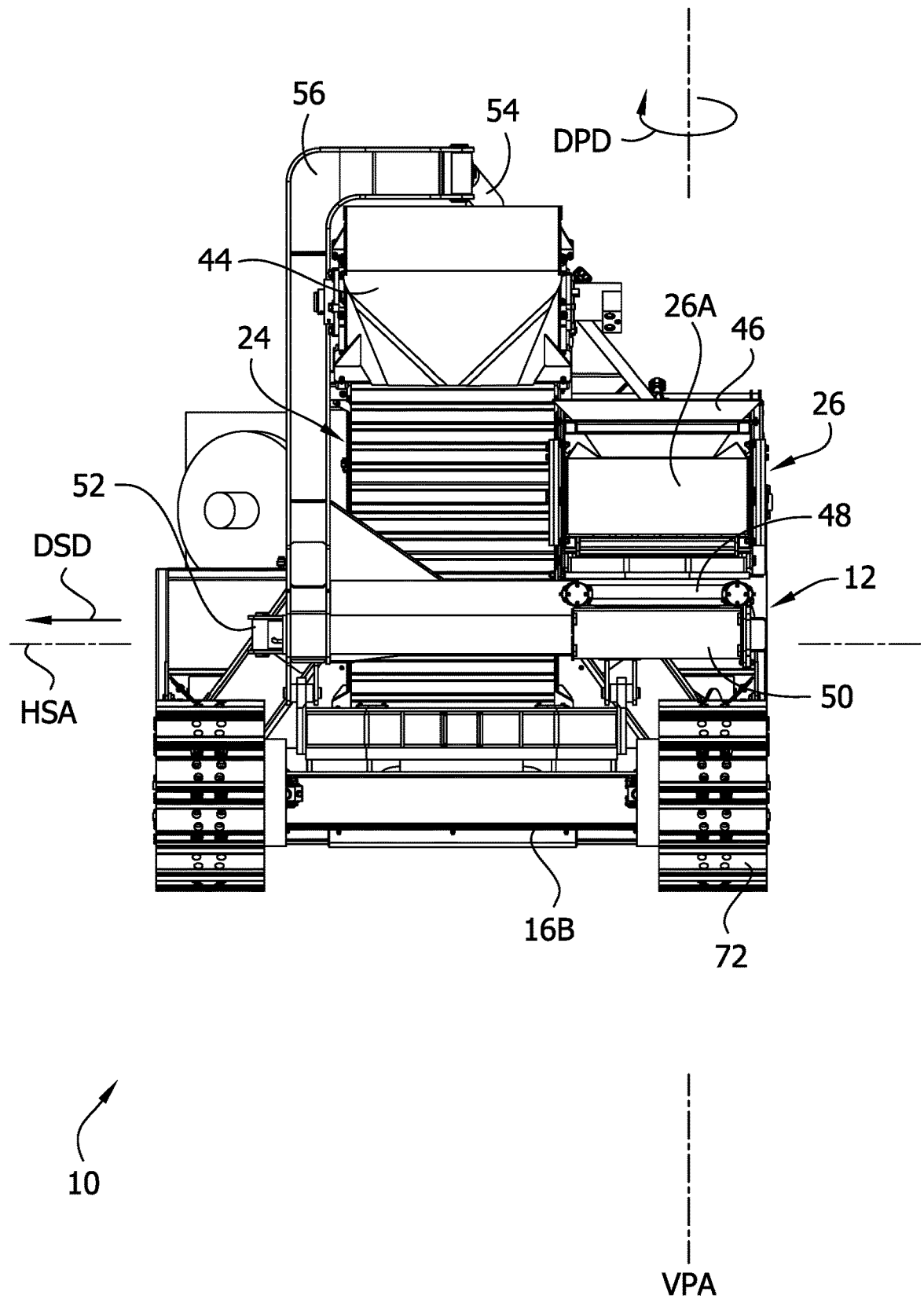
FIG. 6 is a rear elevation of the material placer in the stowed configuration.

The illustrated material placer 10 uses a compound drive mechanism to move the placing conveyor 26 between the stowed and deployed configurations. Referring to FIG. 6, a rotational bearing 48 mounts the upstream end portion 26A of the placing conveyor 26 on a trolley 50 for pivoting with respect to the trolley and the support frame 12 about a vertical placing adjustment axis VPA. A drive motor (e.g., a worm drive; not shown) of the hydraulic system 32 is configured to selectively pivot the placing conveyor on the rotational bearing 48 about the vertical placing adjustment axis VPA. From the stowed configuration, the drive motor must initially pivot the placing conveyor 26 in a deployment pivoting direction DPD about the vertical placing adjustment axis VPA. The trolley 50 is slidably mounted on the rear end portion 12B of the support frame 12. A drive cylinder 52 of the hydraulic system 32 is configured to selectively slide the trolley 50 along a horizontal sliding axis HSA perpendicular to the vertical placing adjustment axis VPA and transverse to the length LS of the support frame to move the placing conveyor 26 into and out of alignment with the transfer conveyor 24. After the placing conveyor 26 is pivoted from the stowed position in the deployment pivoting direction DPD a sufficient amount (e.g., about 90°), the drive cylinder 52 can slide the trolley 50 in a deployment sliding direction DSD to align the upstream end portion 26A with the transfer conveyor 24.

Referring to FIGS. 2 and 5, the placing conveyor 26 is movable relative to the support frame 12 through a range of motion ROM extending from the stowed position to a terminal deployed position shown in phantom in FIG. 5. In one or more embodiments, in the terminal deployed position, the upstream end portion 26A of the placing conveyor 26 is aligned with the transfer conveyor 24 and the axis PA of the placing conveyor is oriented at an angle (e.g., of about +45°) with respect to the axis TA of the transfer conveyor. Suitably, the placing conveyor 26 is permitted to be actuated to convey material only when the placing conveyor is laterally aligned with the transfer conveyor and oriented within an operational segment OS of the range of motion ROM. In the illustrated embodiment, the operational segment OS extends from the terminal position to an initial operational position (shown in solid line in FIG. 5) in which the axis PA of the placing conveyor 26 is oriented at an angle of about −45° with respect to the axis TA of the transfer conveyor. The remainder of the range of motion ROM of the placing conveyor 26 forms a lockout segment LS in which the material placer 10 is configured to prevent actuation of the placing conveyor.

Referring to FIG. 4, in addition to being pivotable about the vertical placing adjustment axis VPA, the illustrated placing conveyor 26 is configured to selectively pivot about a horizontal placing adjustment axis HPA to raise and lower the downstream end portion 26B. A hydraulic drive cylinder 54 is operatively connected between a bracket 56 on the rear end portion 12B of the support frame 12 and (via a link) a bracket 58 adjacent the downstream end portion 26B of the placing conveyor 26. The drive cylinder 54 extends to pivot the placing conveyor 26 in a first direction about the horizontal placing adjustment axis HPA to lower the placing conveyor and retracts to pivot the placing conveyor in an opposite second direction to raise the placing conveyor. Suitably, the placing conveyor 26 is pivotable about the axis HPA to a bottom position in which the downstream end portion 26B of the conveyor 26 is near the ground and to a top position in which the downstream end portion is at least about 12 feet (3.7 m) above the ground. To account for changes in the relative positioning of the connections of the drive cylinder 54 to the brackets 56, 58 when the trolley 50 moves along the horizontal sliding axis HSA, a spherical bearing connects the drive cylinder 54 to the bracket 58. More specifically, the spherical bearing connects a link extending from the end of a rod of the cylinder 54 to the bracket 58.

Figure 7:
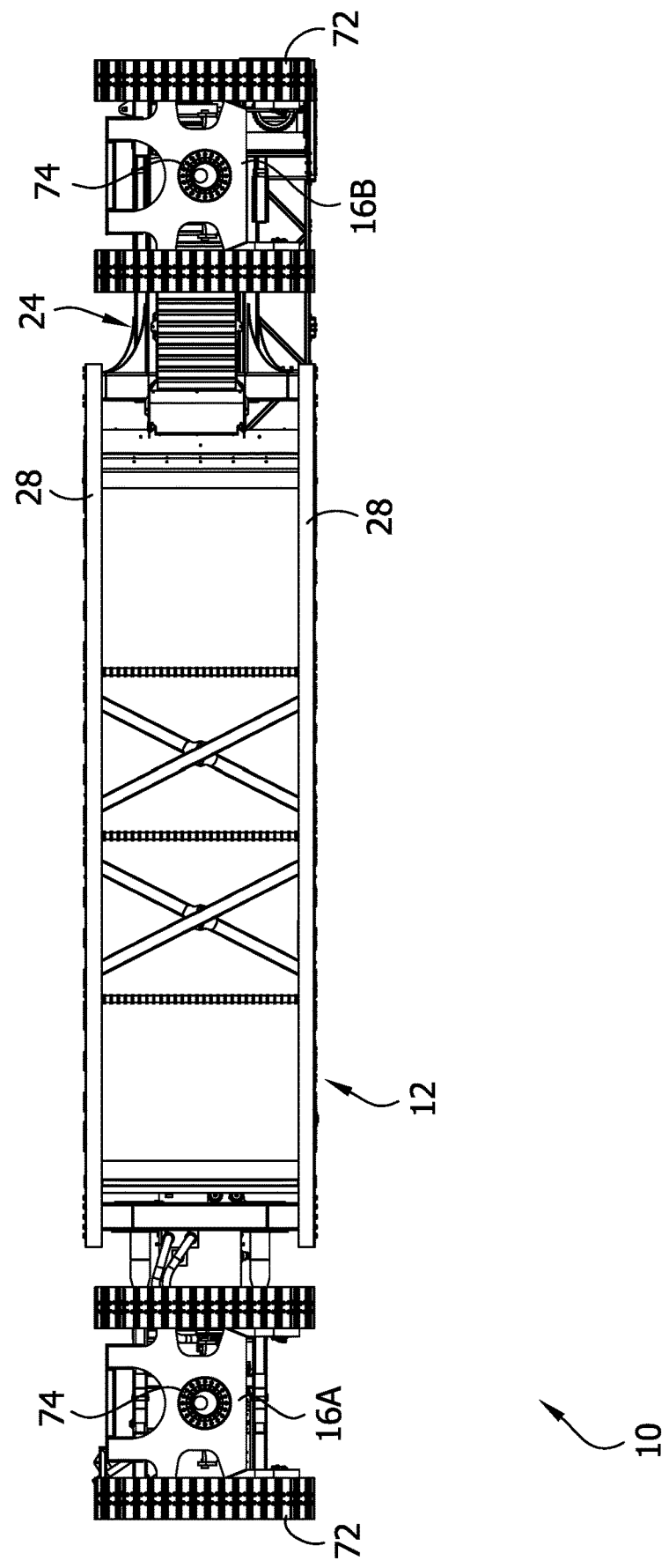
FIG. 7 is a bottom plan view of the material placer in the stowed configuration, illustrating front and rear carriages pivoted for driving the material placer in a lateral direction.
Figure 8:
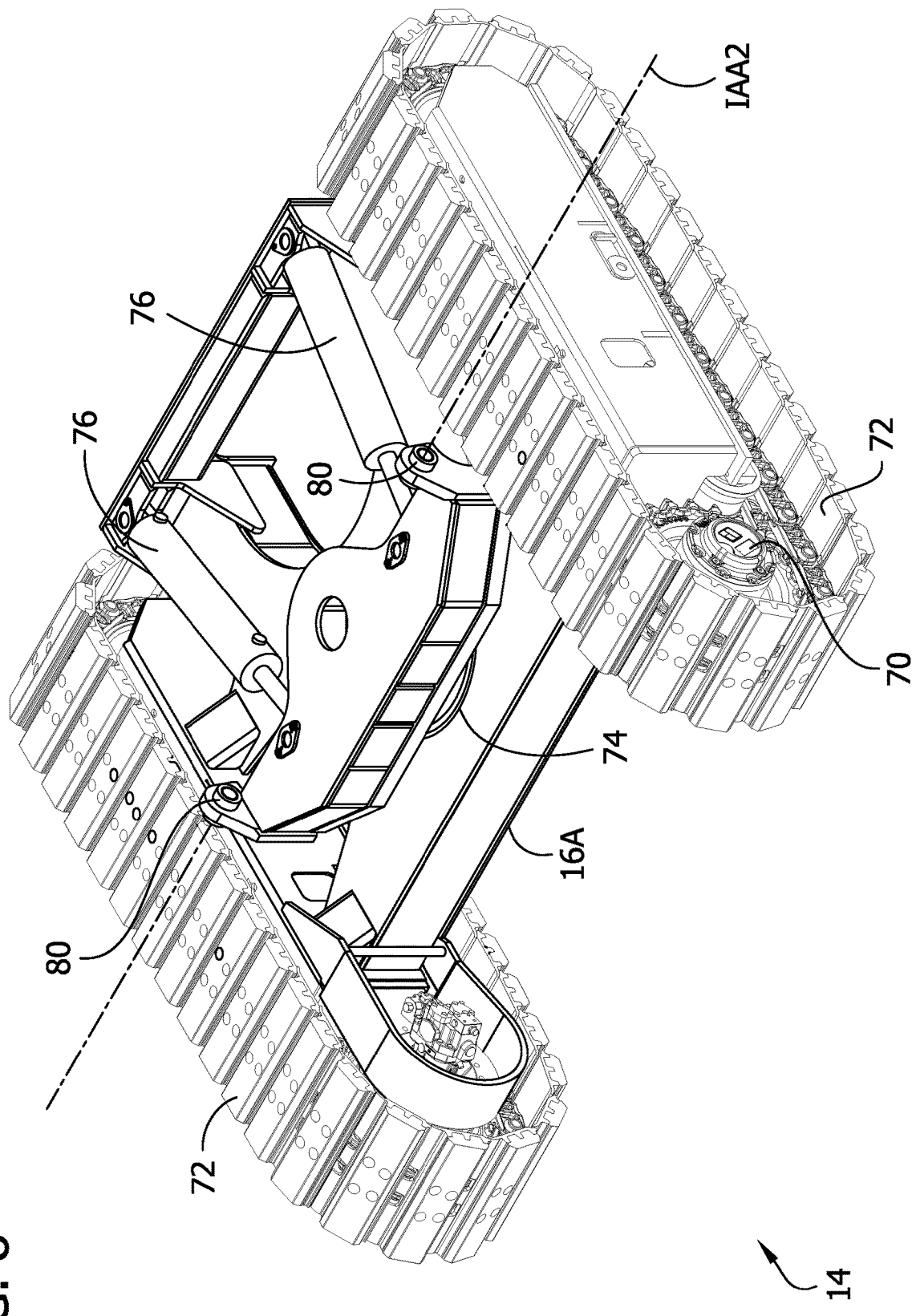
FIG. 8 is a perspective of the front carriage of the material placer.

Referring to FIGS. 3, 7 and 8, the power system 14 of the material placer 10 is configured to drive the material placer over rough and/or uneven terrain. As indicated above, the illustrated power system 14 includes separate front and rear carriages 16A, 16B. Each carriage 16A, 16B supports first and second drive wheels 70 on opposite sides of the carriage for rotation about a respective drive axis. Other embodiments can have other numbers of drive wheels (e.g., one or more) mounted on each carriage. A hydraulic motor (not shown) of the hydraulic power system 32 is configured to drive rotation of the drive wheels 70 with respect to the carriage 16A, 16B. In the illustrated embodiment, each drive wheel is configured to drive a respective continuous track 72. The continuous tracks 72 permit the material placer 10 to handle rough and/or uneven terrain, which is advantageous when driving the material placer 10 beside an unpaved roadway. Suitably, the tracks 72 define a width TW of the power system 14 (FIG. 2) that is less than or equal to about 102 inches (2.59 m) (e.g., about the same as the width of the frame WF), such that the maximum width of the material placer is less than or equal to about 102 inches (2.59 m) and suited for over-the-road transport in the stowed configuration.

A rotational bearing 74 mounts each of the carriages 16A, 16B on the respective end portion 12A, 12B of the support frame 12 for rotation with respect to the support frame about a respective vertical steering axis VSA1, VSA2 (FIG. 3). As shown in FIG. 8, hydraulic drive cylinders 76 are configured to selectively rotate each of the carriages about the respective vertical steering axis VSA1, VSA2 with respect to the support frame 12. (Although only the front carriage 16A is shown in FIG. 8, it will be understood that the rear carriage 16B is substantially identical and includes the same parts). Separately rotating the carriages 16A, 16B about the vertical steering axes VSA1, VSA2 enhances the maneuverability of the material placer 10 in comparison with relying solely on counter-rotation of the continuous tracks 72. It will be understood that counter rotation of the tracks 72 on each carriage 16A, 16B may also be employed. For example, to steer the material placer 10 through tight turns, each of the carriages 16A, 16B can be rotated in opposite directions. In addition, the power system 14 can drive the material placer 10 in any straight line direction by rotating the carriages 16A, 16B about the steering axes VSA1, VSA2 in the same direction. For example to travel at a right angle to the rearward direction RD, each of the carriages 16A, 16B are rotated 90° from forward as shown in FIG. 7 and the drive wheels 70 are all driven in the same direction. It will be understood that the range of rotation of the carriages 16A, 16B may be other than described without departing from the scope of the present invention.

The carriages 16A, 16B are further configured for navigating the material placer over uneven and sloped terrain. Each of the carriages 16A, 16B is configured to pivot with respect to the support frame in response to forces applied to the carriage about a respective horizontal incline adjustment axis IAA1, IAA2 (FIG. 2) oriented perpendicular to the vertical steering axis VSA1. In the illustrated embodiment, each carriage 16A, 16B includes a mounting collar 80 that pivotably mounts the carriage on the respective end portion 12A, 12B of the support frame 12 for pivoting movement about the incline adjustment axis IAA1, IAA2. In use, the slope of the ground may be different at the front and rear end portions 12A, 12B of the support frame 12. To keep the tracks 72 of each carriage 16A, 16B in flush engagement with the ground as much as possible, each carriage can be separately pivoted (e.g., as shown in FIG. 3) about the incline adjustment axis IAA1, IAA2.

In an exemplary method of use, the material placer 10 is transported to the site of a road construction project on a sliding axle trailer. The power system 14 drives the material placer 10 off of the sliding axle trailer at the work site. The power system 14 can for example, be controlled automatically by a controller of the material placer or manually using a remote control system. The power system 14 then drives the material placer 10 over the ground adjacent a location at which the road is being paved. In one embodiment, the power system 14 drives the material placer 10 to a position beside the road being paved and orients the support frame so that the length LS is generally parallel to the roadway. As the power system 14 drives the material placer 10 to the desired position, the hydraulic power system 32 (which can be controlled automatically by a controller or manually using a remote control system) drives the carriages 16A, 16B to pivot about the vertical steering axes VSA1, VSA2 and the incline adjustment axes IAA1, IAA2 to steer the device.

When the power system 14 has driven the material placer 10 to the desired location, the placing conveyor 26 is moved to the deployed configuration. The user first removes the tie-down strap or chain securing the placing conveyor 26 to the support bracket 47. Subsequently, the hydraulic power system 32 pivots the placing conveyor 26 about the vertical placing adjustment axis VPA in the deployment pivoting direction DPD until the placing conveyor extends in a placing direction PD at which it will not interfere with the transfer conveyor 24 when the trolley 50 slides under the transfer conveyor. When the placing conveyor 26 has reached this position, the cylinder 52 drives the trolley 50 to slide along the horizontal sliding axis HSA in the deployment sliding direction DSD until the upstream end portion 26A of the placing conveyor 26 is aligned with the transfer conveyor 24. If necessary, the hydraulic control system 32 pivots the placing conveyor 26 further in the deployment pivoting direction DPD until it reaches the operational segment OS of its range of motion ROM.

In an exemplary method of using the deployed material placer 10, the support frame 12 is positioned adjacent to the road being built. The placing conveyor 26 is oriented in a placing direction PD extending rearward and to the side of the support frame 12 such that the placing chute 49 is positioned over the path of the road. Tractors (not shown) pulling side dump trailers filled with a suitable roadbed material are arranged in a line facing rearward on the side of the material placer 10 opposite from the road. In succession, each tractor drives rearward to align the side dump trailer with the receiving conveyor 20 and then dumps the contents of the trailer onto the receiving conveyor. The length LR of the receiving conveyor corresponds to the length of side dump trailers to receive the load from the trailers. The tractors drive the empty trailers away from the material placer 10 in the rearward direction, without backing up or reversing. In comparison with material placing work flows for rear dump trailers, which require each trailer to back into alignment with the placer and drive away from the placer in the rearward direction over the same path before another trailer can be backed into alignment, the continuous rearward flow of tractors using the illustrated placer 10 provides much higher throughput of road paving material.

Each time a load of roadbed material is dumped onto the receiving conveyor 20, the receiving conveyor conveys the material to the funneling auger 22. The funneling auger 22 conveys the material through the guide opening 34 of the funneling plate 36 to the transfer conveyor 24. The transfer conveyor 24 lifts the material and dispenses it through the chute 44 at the downstream end portion 24B into the funnel 46 of the placing conveyor 26. The placing conveyor 26 conveys the material in the placing direction PD until it reaches the downstream end portion 26B. There, the placing conveyor 26 dispenses the material through the chute 49 onto the receiving area of the road paving machine. In many cases, the receiving area of a road paving machine is the ground immediately in front of the road paving machine in its direction of travel. For concrete road paving machines in particular, it may be desirable to spread the concrete in front of the machine across substantially the entire width of the roadway. Suitably, a user can continuously sweep the placing chute 49 across the width of the roadway by pivoting the placing conveyor 26 back and forth about the vertical placing adjustment axis VPA using the hydraulic system 32.

When work at the jobsite is complete, the material placer 10 is returned to the stowed configuration. The hydraulic cylinder 54 raises the placing conveyor 26 so that the downstream end portion 26B is at least as high as the support bracket 47. The hydraulic cylinder 52 drives the trolley 50 along the horizontal placing adjustment axis HPA opposite the deployment sliding direction DSD, and the hydraulic power system 32 pivots the placing conveyor 26 about the vertical placing adjustment axis VPA opposite the deployment pivoting direction DPD until the placing conveyor extends over the support frame 12. The placing conveyor is lowered into supporting contact with the support bracket 47 and the user straps the downstream end portion 26B of the placing conveyor to the support bracket. The placer 10 is then driven back onto the sliding axle trailer. In the stowed configuration, the material placer 10 is dimensioned for being transported over the U.S. interstate highway system or another road to another jobsite or a storage location.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A material placer for placing material at a placing location, the material placer comprising:
    a support frame having a length extending along a longitudinal axis of the material placer and sides separated in a direction transverse to the length;
    a receiving conveyor supported on the support frame and extending from an upstream end portion to a downstream end portion, the receiving conveyor configured to convey the received material on an upper surface of the receiving conveyor along a flow path to a location adjacent the downstream end portion thereof, the upper surface having a length extending along the longitudinal axis;
    a material receiving opening located on a side of the material placer and facing in a direction transverse to the material flow path on the receiving conveyor, the material receiving opening being sized and shaped to receive material dumped from a side dump trailer;
    the support frame being free of structure projecting outward from the side of the support frame for permitting a side dump trailer to be positioned next to the support frame side so that the contents of the side dump trailer can be dumped from the side dump trailer through the material receiving opening directly onto the receiving conveyor;
    a transfer conveyor supported on the support frame and extending from an upstream end portion to a downstream end portion, the transfer conveyor being configured to receive at the upstream end portion the material conveyed by the receiving conveyor, the transfer conveyor being configured to convey the material to a location adjacent the downstream end portion and being oriented at an incline with respect to the support frame to lift the material with respect to the support frame as the transfer conveyor conveys the material; and
    a placing conveyor supported on the support frame and having an upstream end portion and a downstream end portion, the placing conveyor being configured to receive at the upstream end portion the material conveyed from the transfer conveyor and convey the material in a placing direction extending away from the support frame to the placing location.

2. A material placer as set forth in claim 1 wherein the placing conveyor is movable with respect to the support frame to adjust the placing direction.

3. A material placer as set forth in claim 1 wherein the placing conveyor is configured to pivot with respect to the support frame about a vertical axis oriented generally perpendicular to the receiving conveyor and about a horizontal axis oriented generally perpendicular to the vertical axis.

4. A material placer as set forth in claim 1 wherein the placing conveyor has a length extending between the upstream end portion and the downstream end portion of at least 12 feet (3.7 m).

5. A material placer as set forth in claim 1 wherein the receiving conveyor has a length extending between the upstream end portion and the downstream end portion of at least 15 feet (4.6 m) and a width extending transverse to the length of at least 80 inches (203 cm).

6. A material placer as set forth in claim 1 further comprising a funneling auger configured to convey material from said location adjacent the downstream end portion of the receiving conveyor to the upstream end portion of the transfer conveyor.

7. A material placer as set forth in claim 1 wherein the support frame has a length and the transfer conveyor has a length oriented at an angle of incline with respect to the length of the support frame, the angle of incline being in an inclusive range of from 20° to about 45°.

8. A material placer as set forth in claim 1 wherein the material receiving opening opens to a side of the support frame.

9. A material placer as set forth in claim 8 wherein the material receiving opening has a length parallel to the longitudinal axis of the support frame, the length of the material receiving opening being least one fourth the length of the support frame.

10. A material placer for placing material at a placing location, the material placer comprising:
    a support frame having a length and a front end portion and a rear end portion spaced apart along the length;
    a receiving conveyor supported on the support frame sized and arranged for receiving the material when the material is dumped from a side dump trailer and configured to convey the received material in a rearward direction along the length of the support frame; and
    a placing conveyor having an upstream end portion and a downstream end portion, the placing conveyor being movable with respect to the support frame from a stowed position in which the placing conveyor extends over the receiving conveyor to a conveying position in which the upstream end portion of the placing conveyor is positioned for receiving the material conveyed from the receiving conveyor and the downstream end portion of the placing conveyor is spaced apart from the receiving conveyor for conveying the material to the placing location;
    wherein the placing conveyor has a conveying range of motion including said conveying position in which the placing conveyor is configured to be actuated to convey the material and a lockout range of motion including said stowed positioned in which the material placer is configured to prevent actuation of the placing conveyor.

11. A material placer as set forth in claim 10 wherein the placing conveyor is pivotable with respect to the support frame about a vertical axis adjacent the upstream end portion thereof.

12. A material placer as set forth in claim 11 wherein the placing conveyor is slidable with respect to the support frame along an axis transverse to the length of the support frame.

13. A material placer as set forth in claim 10 further comprising a transfer conveyor having a length for transferring the material conveyed from the receiving conveyor to the placing conveyor, the upstream end portion of the placing conveyor being laterally spaced apart from the transfer conveyor in the stowed position and aligned with the length of the transfer conveyor in the conveying position.

14. A material placer as set forth in claim 10 wherein the material placer has a maximum width when the placer is in the stowed position of less than 102 inches (2.59 m).

15. A material placer as set forth in claim 10 wherein the placing conveyor includes a range of motion that is greater than 180°.

16. A material placer as set forth in claim 10 wherein the placing conveyor has a length that is greater than one half the length of the support frame.

* * * * *